United States Patent
Murchie et al.

(10) Patent No.: US 9,763,551 B2
(45) Date of Patent: Sep. 19, 2017

(54) AIR MOVING APPLIANCE WITH ON-BOARD DIAGNOSTICS

(71) Applicant: Dyson Technology Limited, Wiltshire (GB)

(72) Inventors: Russell Scott Murchie, Bristol (GB); Mark Stamford Vanderstegen-Drake, Gloucester (GB)

(73) Assignee: DYSON TECHNOLOGY LIMITED, Malmesbury, Wiltshire (GB)

( * ) Notice: Subject to any disclaimer, the term of this patent is extended or adjusted under 35 U.S.C. 154(b) by 22 days.

(21) Appl. No.: 14/256,646

(22) Filed: Apr. 18, 2014

(65) Prior Publication Data

US 2014/0312813 A1    Oct. 23, 2014

(30) Foreign Application Priority Data

Apr. 19, 2013 (GB) .................................. 1307142.8

(51) Int. Cl.
*H02P 6/06* (2006.01)
*A47L 9/28* (2006.01)
(Continued)

(52) U.S. Cl.
CPC ............... *A47L 9/2842* (2013.01); *A47L 9/12* (2013.01); *A47L 9/2821* (2013.01);
(Continued)

(58) Field of Classification Search
CPC ...... F04D 27/004; F04D 17/10; F04D 19/007; F04D 25/166; F24F 11/0079;
(Continued)

(56) References Cited

U.S. PATENT DOCUMENTS

| | | | | |
|---|---|---|---|---|
| 5,492,273 A | * | 2/1996 | Shah | .................... F24F 11/0009 236/11 |
| 5,500,581 A | * | 3/1996 | Hatanaka | ................. H02P 23/08 318/727 |
| 5,559,407 A | * | 9/1996 | Dudley | .................. F04D 27/004 318/400.08 |
| 5,592,058 A | * | 1/1997 | Archer | .................. F24F 11/0009 318/400.08 |
| 5,592,059 A | * | 1/1997 | Archer | .................. F24F 11/0009 318/400.08 |
| 5,592,508 A | * | 1/1997 | Cooper | .................... H04L 25/14 341/143 |

(Continued)

FOREIGN PATENT DOCUMENTS

| | | |
|---|---|---|
| DE | 198 30 737 | 1/2000 |
| EP | 1 887 443 | 2/2008 |
| GB | 2469138 | 10/2010 |
| JP | 2000-69787 | 3/2000 |
| WO | WO-00/38025 | 6/2000 |
| WO | WO-2008/009886 | 1/2008 |

OTHER PUBLICATIONS

International Search Report and Written Opinion mailed Jul. 3, 2014, directed to International Application No. PCT/GB2014/051054; 9 pages.

(Continued)

*Primary Examiner* — Paul Ip
(74) *Attorney, Agent, or Firm* — Morrison & Foerster LLP

(57) ABSTRACT

An air moving appliance comprising an electric motor coupled to a fan, a control system for controlling the motor, the control system including monitoring means configured to monitor a motor load parameter; memory means configured to store a predetermined reference motor load parameter value; compensating means that determines a compensated reference motor load parameter value based on the predetermined reference motor load parameter value and a set of ambient environment input conditions; comparison means configured to compare the motor load parameter and the compensated reference motor load parameter value and trigger an operational event based on the result of the comparison. The invention also relates to a method of controlling an air moving appliance.

29 Claims, 10 Drawing Sheets

(51) Int. Cl.
*A47L 9/12* (2006.01)
*H02P 6/34* (2016.01)

(52) U.S. Cl.
CPC ........... *A47L 9/2831* (2013.01); *A47L 9/2852* (2013.01); *H02P 6/34* (2016.02); *A47L 2201/06* (2013.01)

(58) Field of Classification Search
CPC ........... F24F 11/0086; F24F 2011/0091; F24F 11/0009; F24F 11/0001; F24F 11/0012; F24F 2011/0046; F24F 2011/0083; Y02B 30/746
USPC ..... 318/400.03, 400.08, 400.11, 400.18, 432
See application file for complete search history.

(56) References Cited

U.S. PATENT DOCUMENTS

| | | | | |
|---|---|---|---|---|
| 5,959,430 A * | 9/1999 | Yuki | ...................... | H02P 21/09 318/805 |
| 5,965,995 A * | 10/1999 | Seibel | ...................... | H02P 21/22 318/432 |
| 6,021,252 A * | 2/2000 | Faris | ...................... | F24F 11/0079 388/827 |
| 6,131,237 A | 10/2000 | Kasper et al. | | |
| 6,215,261 B1 * | 4/2001 | Becerra | ...................... | H02P 6/085 318/375 |
| 6,459,955 B1 * | 10/2002 | Bartsch | ...................... | A47L 9/00 318/568.11 |
| RE38,406 E * | 1/2004 | Faris | ...................... | F24F 11/0079 388/825 |
| 6,895,176 B2 * | 5/2005 | Archer | ...................... | H02P 6/001 310/220 |
| 7,026,771 B2 * | 4/2006 | Kushida | ...................... | H02P 25/14 318/798 |
| 7,436,138 B2 * | 10/2008 | Beifus | ...................... | F04D 27/004 318/362 |
| 7,671,555 B2 * | 3/2010 | Mullin | ...................... | F04D 27/004 236/51 |
| 7,795,827 B2 * | 9/2010 | Jeung | ...................... | H02P 6/085 235/454 |
| 7,812,556 B2 * | 10/2010 | Jeung | ...................... | H02P 6/085 235/454 |
| 8,049,447 B2 * | 11/2011 | Jeung | ...................... | H02P 6/085 318/400.04 |
| 8,072,167 B2 * | 12/2011 | Jeung | ...................... | H02P 6/085 235/454 |
| 8,134,319 B2 * | 3/2012 | Jeung | ...................... | F04D 27/004 318/432 |
| 8,232,755 B2 * | 7/2012 | Jeung | ...................... | H02P 6/20 318/400.26 |
| 8,326,464 B2 * | 12/2012 | Clanin | ...................... | F24F 11/0001 454/228 |
| 8,587,233 B2 * | 11/2013 | Bass | ...................... | H02P 6/28 318/400.01 |
| 8,657,585 B2 * | 2/2014 | Hong | ...................... | F24F 11/0076 417/44.11 |
| 8,901,867 B2 * | 12/2014 | Mullin | ...................... | H02P 6/182 318/400.11 |
| 8,920,132 B2 * | 12/2014 | Havard, Jr. | ...................... | F04D 27/004 318/400.08 |
| 2004/0051496 A1 * | 3/2004 | Archer | ...................... | H02P 6/001 318/825 |
| 2005/0065662 A1 | 3/2005 | Reindle et al. | | |
| 2005/0163615 A1 * | 7/2005 | Chheda | ...................... | H01L 23/34 416/31 |
| 2005/0253539 A1 * | 11/2005 | Kushida | ...................... | H02P 25/14 318/98 |
| 2007/0152613 A1 * | 7/2007 | Mullin | ...................... | F04D 27/004 318/432 |
| 2007/0205732 A1 * | 9/2007 | Beifus | ...................... | F04D 27/004 318/432 |
| 2009/0134823 A1 * | 5/2009 | Jeung | ...................... | F04D 27/004 318/400.18 |
| 2009/0134827 A1 * | 5/2009 | Jeung | ...................... | F04D 27/004 318/432 |
| 2009/0136220 A1 * | 5/2009 | Jeung | ...................... | F04D 27/004 388/806 |
| 2009/0136359 A1 * | 5/2009 | Jeung | ...................... | F04D 27/004 417/44.1 |
| 2009/0136360 A1 * | 5/2009 | Jeung | ...................... | F04D 27/004 417/44.11 |
| 2009/0137199 A1 * | 5/2009 | Jeung | ...................... | F04D 27/004 454/230 |
| 2009/0218968 A1 * | 9/2009 | Jeung | ...................... | H02P 6/085 318/400.04 |
| 2009/0218971 A1 * | 9/2009 | Jeung | ...................... | H02P 6/085 318/400.17 |
| 2009/0224709 A1 * | 9/2009 | Jeung | ...................... | H02P 6/085 318/400.13 |
| 2009/0277196 A1 * | 11/2009 | Gambiana | ...................... | F25B 39/028 62/115 |
| 2009/0277197 A1 * | 11/2009 | Gambiana | ...................... | F25B 39/028 62/115 |
| 2009/0324426 A1 * | 12/2009 | Moody | ...................... | F04B 39/0207 417/13 |
| 2010/0057258 A1 * | 3/2010 | Clanin | ...................... | F24F 11/0001 700/276 |
| 2010/0070085 A1 * | 3/2010 | Harrod | ...................... | F24F 11/0086 700/276 |
| 2010/0070086 A1 * | 3/2010 | Harrod | ...................... | F24F 11/0086 700/276 |
| 2010/0070089 A1 * | 3/2010 | Harrod | ...................... | F24F 11/0086 700/277 |
| 2010/0070093 A1 * | 3/2010 | Harrod | ...................... | F24F 11/0086 700/278 |
| 2010/0070907 A1 * | 3/2010 | Harrod | ...................... | F24F 11/0086 715/772 |
| 2010/0076605 A1 * | 3/2010 | Harrod | ...................... | G05D 23/1905 700/276 |
| 2010/0253266 A1 * | 10/2010 | Jeung | ...................... | H02P 6/20 318/400.26 |
| 2010/0315223 A1 * | 12/2010 | Gross | ...................... | G05B 13/048 340/500 |
| 2011/0025245 A1 * | 2/2011 | Jeung | ...................... | H02P 6/085 318/400.26 |
| 2011/0181216 A1 * | 7/2011 | Bass | ...................... | H02P 6/28 318/400.11 |
| 2011/0194947 A1 * | 8/2011 | Hong | ...................... | F24F 11/0076 417/44.11 |
| 2011/0260671 A1 * | 10/2011 | Jeung | ...................... | H02P 6/08 318/701 |
| 2011/0271469 A1 * | 11/2011 | Ziegler | ...................... | A47L 5/14 15/97.1 |
| 2011/0302939 A1 * | 12/2011 | Rockenfeller | ...................... | H02P 1/30 62/89 |
| 2012/0036659 A1 * | 2/2012 | Ziegler | ...................... | A47L 5/14 15/50.1 |
| 2012/0125558 A1 * | 5/2012 | Nortman | ...................... | G01F 1/68 165/11.1 |
| 2012/0171050 A1 * | 7/2012 | Havard, Jr. | ...................... | F04D 27/004 417/44.1 |
| 2012/0185101 A1 * | 7/2012 | Leen | ...................... | F24F 11/006 700/278 |
| 2012/0274249 A1 * | 11/2012 | Mullin | ...................... | H02P 6/182 318/400.11 |

OTHER PUBLICATIONS

Search Report issued Aug. 29, 2013, directed to GB Application No. 1307142.8, 1 page.

* cited by examiner

AIR MOVING APPLIANCE WITH ON-BOARD DIAGNOSTICS

REFERENCE TO RELATED APPLICATIONS

This application claims the priority of United Kingdom Patent Application No. 1307142.8, filed Apr. 19, 2013, the entire contents of which are incorporated herein by reference.

FIELD OF THE INVENTION

The invention relates to an air moving appliance and in particular, although not exclusively to a vacuum cleaner. More specifically, the invention relates to a method and apparatus to diagnose fault conditions within the airflow passages of the air moving appliance.

BACKGROUND OF THE INVENTION

As is well known, vacuum cleaners use an electric motor driven fan unit to generate suction which draws dirt-laden air through a dirty air inlet into the body of the vacuum cleaner. The dirty air passes through a separating apparatus, either in the form of a bag or a cyclonic separation system, in order to separate the dirt particles from the air flow.

Whether the separation apparatus involves a bagged or a 'bagless' system, the vacuum cleaner must be emptied when it is full. Continued operation of the vacuum cleaner when it is in a full state may impair its performance or may cause blockages in other parts of the vacuum cleaner so prompt attention is desirable. In some machines it is left up to the user to determine whether the bag or bin is full, although some machines incorporate a suitable mechanism to indicate to a user when the vacuum cleaner needs to be emptied. A similar issue can arise with filters which become blocked. Over-loaded filters present an undesirable resistance to airflow and a resultant loss of airflow power. Therefore it is desirable to identify a fault condition with a filter promptly in order to encourage filter maintenance in a timely manner.

In a known system, documented in WO01/28401, an indication that the vacuum cleaner is blocked is determined on the basis of monitoring the speed of the fan motor. Here, a control unit monitors a speed or power draw parameter of the fan motor and triggers a warning indicator when the parameter exceeds a preset value for a predetermined period of time. In addition to triggering a warning indicator, the suction fan may also be disabled as a further response to the overspeed condition. The benefit of such a system is that it is capable of determining if the vacuum cleaner is blocked merely by monitoring the speed of the suction fan motor with existing hardware. It does not therefore require additional electronic or mechanical means of monitoring the blockage condition of the machine so it is a cost effective system. However, in practice such a diagnostic method lacks robustness across a range of operating conditions of the vacuum cleaner so its usefulness is limited.

A more practical system for monitoring a fault condition of a vacuum cleaner, and air moving appliances more generally, is required.

SUMMARY OF THE INVENTION

Against this background, the invention provides an air moving appliance comprising an electric motor coupled to a fan, a control system for controlling the electric motor, the control system including monitoring means configured to monitor a motor load parameter, memory means configured to store a predetermined reference motor load parameter value, compensating means that determines a compensated reference motor load parameter value based on the predetermined reference motor load parameter value and a set of ambient environment input conditions and comparison means configured to compare the motor load parameter and the compensated reference motor load parameter value and trigger an operational event based on the result of the comparison.

In a second aspect, the invention also resides in a method for controlling an air moving appliance having an electric motor coupled to a fan, the method comprising monitoring a motor load parameter of the motor, storing a predetermined reference motor load parameter value, calculating a compensated reference motor load parameter value based on the predetermined reference motor speed value and a set of ambient environment input conditions, comparing the monitored motor load parameter value of the motor and the compensated reference motor load parameter value, and performing an operational event based on the result of the comparison.

The invention provides an advantage that the process of monitoring a parameter that is indicative of the load on the motor is unaffected by the ambient environmental conditions of the appliance. So, the monitored motor load parameters are, in effect, corrected for the influence of ambient air density on the motor in order to diagnose fault conditions within the air flow system of the appliance accurately and reliably.

Preferably, the compensated reference motor load parameter value represents a motor running condition indicative of a blockage within the airflow pathways of the appliance.

The ambient environmental condition is preferably air density and, to this end, the appliance may be provided with a pressure sensor and a temperature sensor. These may be dedicated sensors located at suitable points on the appliance or they may be integrated sensors positioned on one or more electronic circuit components within the appliance. Preferably, the pressure sensor should be positioned in an air flow passage of the appliance in measure the pressure upstream of the fan, although this is not essential to the acceptable accuracy of the system.

The compensating means may calculate the compensated reference motor load parameter at repeated intervals during the operation of the appliance. However, in order to reduce computational overhead, it is envisaged that it is sufficient for the compensating means may only to carry out its calculation when the appliance is turned on.

As a measure to further enhance accuracy of the system, the predetermined reference motor load parameter value may be calibrated to the motor installed within the appliance which would correct for inaccuracies due to manufacturing tolerances.

Preferably, the comparison means triggers an operation even when the monitored motor load parameter value of the motor exceeds the compensated reference motor load parameter value and the operational event may include deactivation of the appliance.

Although the invention applies to a wide range of air moving appliances such as hand dryers, hair dryers and environmental control apparatus, in one embodiment the appliance is a vacuum cleaner, and preferably a robotic vacuum cleaner having a drive means for propelling the robotic vacuum cleaner across a floor surface under the control of a central control system. In this case, in an attempt to clear a blockage the operational event may include deactivation of the fan motor for a preset period of time which the drive means is enabled to drive the vacuum cleaner.

In addition to monitoring for a fault condition that reduces the load on the motor by reducing the mass air flow therethrough, the invention may include comparing the motor load parameter value against a second reference motor load parameter value which is indicative of the appliance being activated without an associated filter or separating system installed in the airflow path of the appliance. For example, if a vacuum cleaner is activated without its separating system in place, or without a pre-motor filter in place, this would increase the air mass flow through the appliance thereby imposing an increased load on the motor. The motor would therefore draw more power in a motor system controlled to operate at a substantially constant speed, or would run at a lower speed in a motor system controlled to operate at a substantially constant output power.

The invention also resides in a computer program product stored on a computer readable medium and containing program code instructions configured to carry out the method of the invention when executed on a suitable computing device.

BRIEF DESCRIPTION OF THE DRAWINGS

In order that the invention may be more readily understood, embodiments will now be described by way of example only with reference to the accompanying drawings, in which.

DETAILED DESCRIPTION OF THE INVENTION

Figure 1:
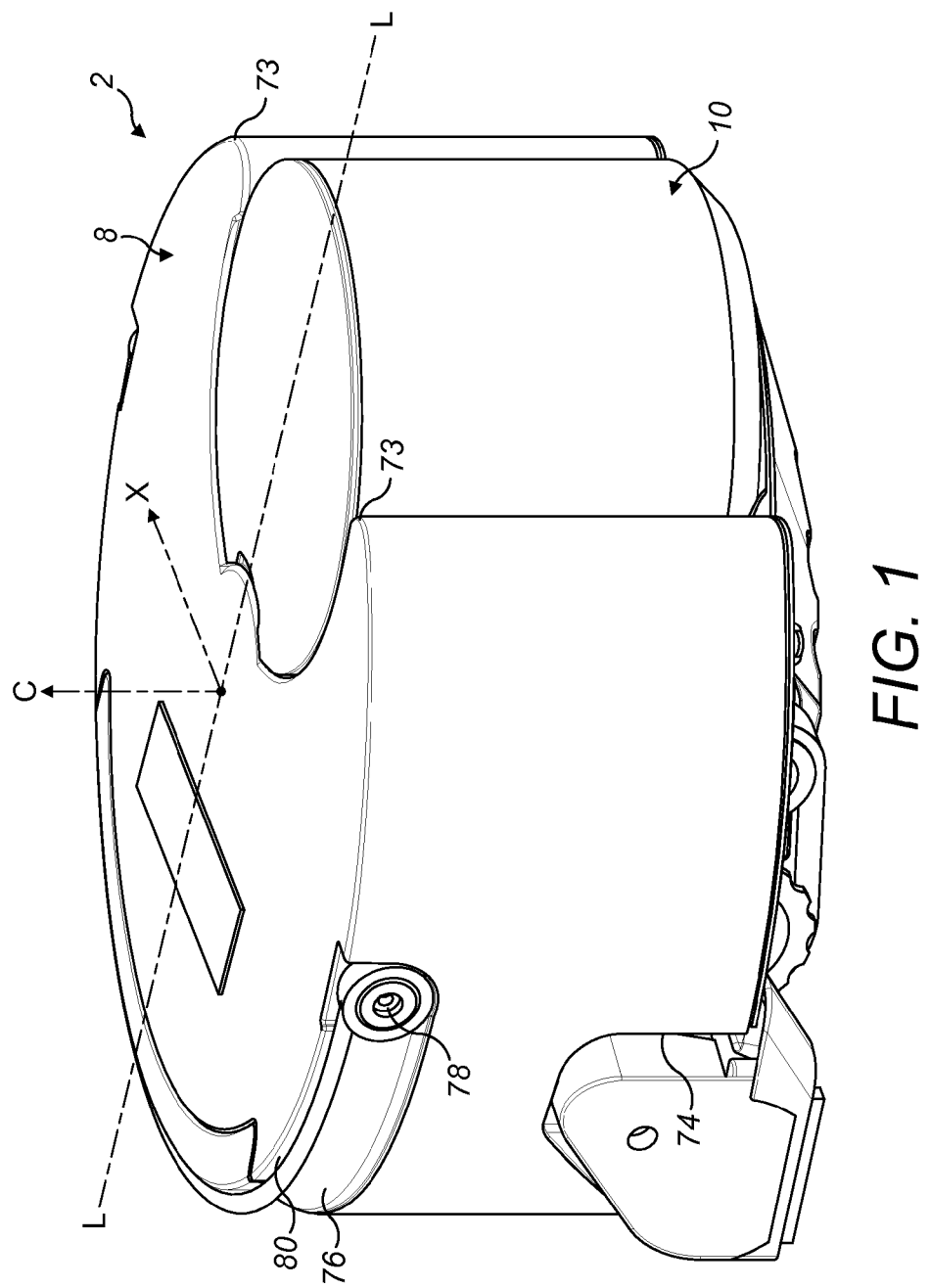
FIG. 1 is a perspective view of a vacuum cleaner, more specifically an autonomous or 'robotic' vacuum cleaner, in which the invention is embodied.

With reference to FIGS. 1, 2, 3 and 4 of the drawings, an appliance, in the form of a mobile robotic vacuum cleaner 2 (hereinafter 'robot') comprises a main body having four principal assemblies: a chassis (or sole plate) 4, a body 6 which is carried on the chassis 4, a generally circular outer cover 8 which is mountable on the chassis 4 and provides the robot 2 with a generally circular profile, and a separating apparatus 10 that is carried on a forward part of the body 6 and which protrudes through a complementary shaped cutout 12 of the outer cover 8.

For the purposes of this specification, the terms 'front' and 'rear' in the context of the robot will be used in the sense of its forward and reverse directions during operation, with the separating apparatus 10 being positioned at the front of the robot. Similarly, the terms 'left' and 'right' will be used with reference to the direction of forward movement of the robot.

The chassis 4 supports several components of the robot and is preferably manufactured from a high-strength injection moulded plastics material, such as ABS (acrylonitrile butadiene styene), although it could also be made from appropriate metals such as aluminium or steel, or composite materials such a carbon fibre composite to name a few examples. As will be explained, the primary function of the chassis 4 is as a drive platform and to carry cleaning apparatus for cleaning the surface over which the robot travels.

Figure 3:
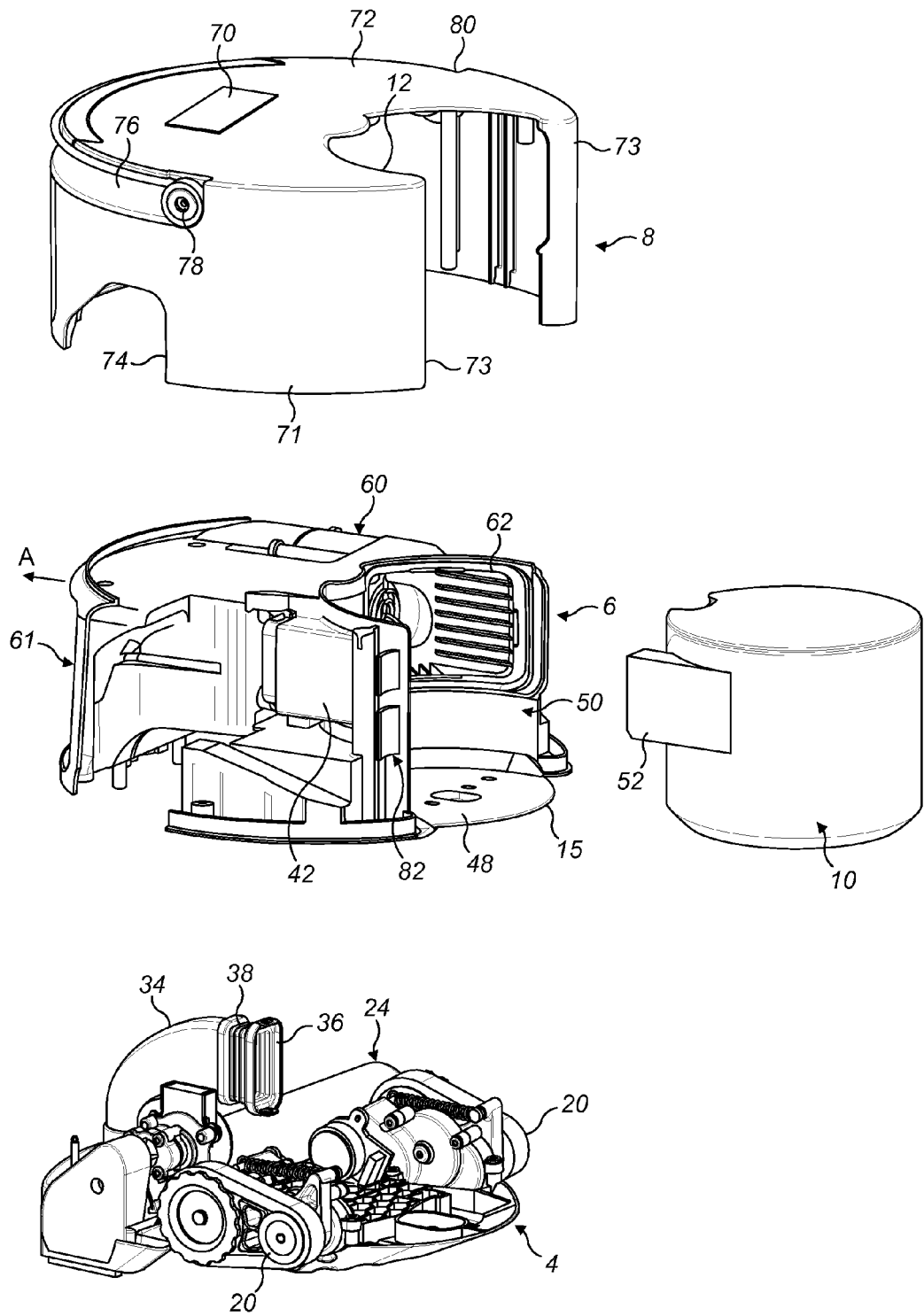
FIG. 3 is an exploded view of the vacuum cleaner in FIG. 1 so as to show its main assemblies.

With particular reference to FIG. 3, a front portion 14 of the chassis 4 is relatively flat and tray-like in form and defines a curved prow 15 that forms the front of the robot 2. Each flank of the front portion 14 has a respective traction unit 20 mounted to it.

The pair of traction units 20 are located on opposite sides of the chassis 4 and are operable independently to enable to robot to be driven in forward and reverse directions, to follow a curved path towards the left or right, or to turn on the spot in either direction, depending on the speed and direction of rotation of the traction units 20. Such an arrangement is sometimes known as a differential drive.

Figure 2:
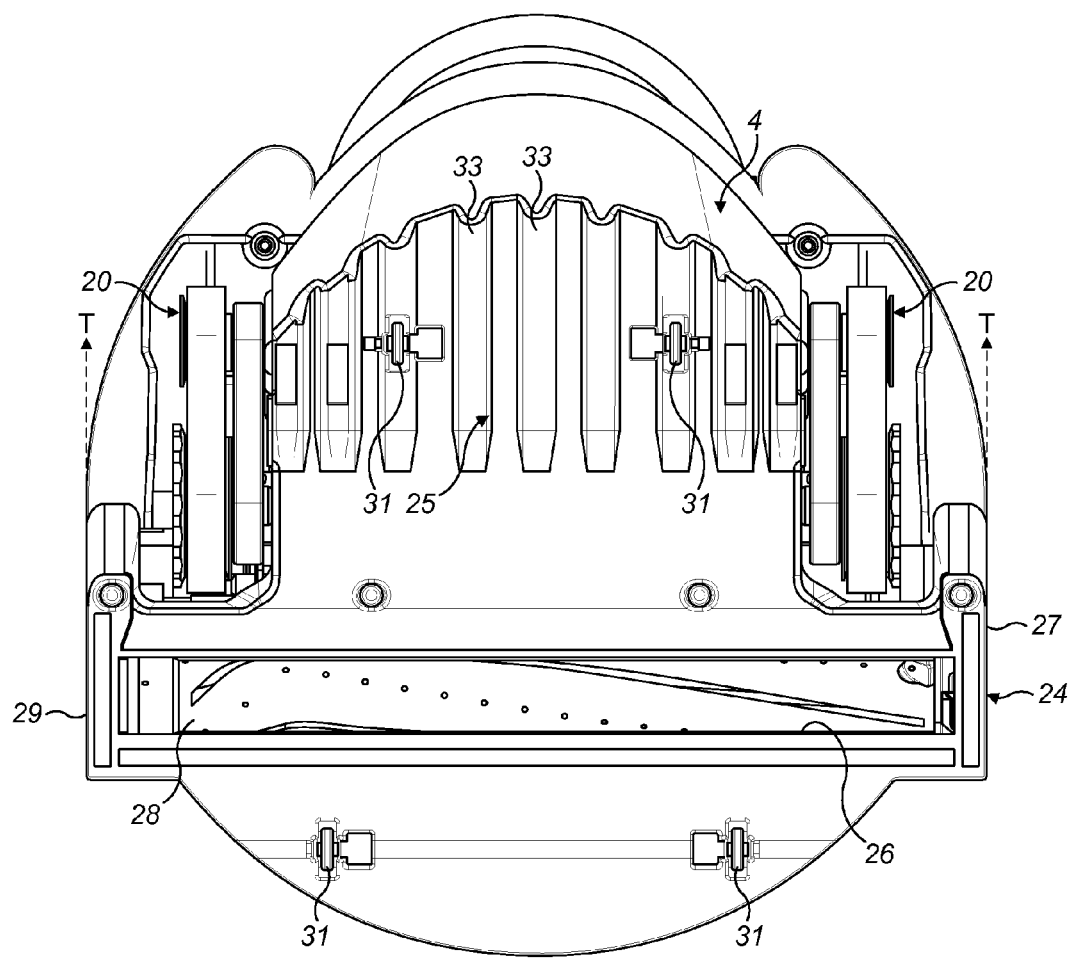
FIG. 2 is an underside view of the vacuum cleaner in FIG. 1.

The relatively narrow front portion 14 of the chassis 4 widens into rear portion 22 which includes a surface treating assembly 24 or 'cleaner head' having a generally cylindrical form and which extends transversely across substantially the entire width of the chassis 4 relative to its longitudinal axis 'L'. With reference also to FIG. 2, which shows the underside of the robot 2, the cleaner head 24 defines a rectangular suction opening 26 that faces the supporting surface and into which dirt and debris is drawn into when the robot 2 is operating. An elongate brush bar 28 is contained within the cleaner head 24 and is driven by an electric motor 30 via a reduction gear and drive belt arrangement 32 in a conventional manner, although other drive configurations such as a solely geared transmission or a direct drive are also envisaged. Moreover, although a wheel-based drive arrangement is shown, other drive systems are also acceptable such as a legged-based system.

The underside of the chassis 4 features an elongate sole plate section 25 extending forward of the suction opening 26 which includes a plurality of channels 33 (only two of which are labeled for brevity) providing pathways for dirty air being drawn towards the suction opening 26. The underside of the chassis 4 also carries a plurality (four in the illustrated embodiment) of passive wheel or rollers 31 which provide further bearing points for the chassis 4 when it is at rest on or moving over a floor surface.

The cleaner head 24 has first and second end faces 27, 29 that extend to the edge of the chassis 4 and which are in line with the cover 8 of the robot. Considered in horizontal or plan profile as in FIG. 2, it can be seen that the end faces 27, 29 of the cleaner head 24 are flat and extend at a tangent (labeled as 'T') to the cover 8 at diametrically opposed points along the lateral axis 'X' of the robot 2. The benefit of this is that the cleaner head 24 is able to run extremely close to the walls of a room as the robot traverses in a 'wall following' mode therefore being able to clean right up to the wall.

Dirt drawn into the suction opening 26 during a cleaning operation exits the cleaner head 24 via a conduit 34 which extends upwardly from the cleaner head 24 and curves towards the front of the chassis 4 through approximately 90° of arc until it faces in the forwards direction. The conduit 34 terminates in a rectangular mouth 36 having a flexible bellows arrangement 38 shaped to engage with a complementary shaped duct 42 provided on the body 6. The duct 42 is provided on a front portion 46 of the body 6, and opens into a forward facing generally semi-cylindrical recess 50 having a generally circular base platform 48. The recess 50 and the platform 48 provide a docking portion into which the separating apparatus 10 is mounted, in use, and from which it can be disengaged for emptying purposes.

It should be noted that in this embodiment the separating apparatus 10 consists of a cyclonic separator of the type disclosed in WO2008/009886, for example, the contents of which are incorporated by reference. The configuration of such separating apparatus is well known and will not be described any further here, save to say that the separating apparatus 10 may be removably attached to the body 6 by a suitable mechanism such as a quick-release fastening means to allow the apparatus 10 to be emptied when it becomes full. The nature of the separating apparatus 10 is not central to the invention and the cyclonic separating apparatus may instead separate dirt from the airflow by other means that are known in the art for example a filter-membrane, a porous box filter or some other form of separating apparatus.

When the separating apparatus 10 is engaged in the docking portion 50, a dirty air inlet 52 of the separating apparatus 10 is received by the duct 42 and the other end of the duct 42 is connectable to the mouth 36 of the brush bar conduit 34, such that the duct 42 transfers the dirty air from the cleaner head 24 to the separating apparatus 10.

Dirty air is drawn through the separating apparatus 10 by an airflow generator which, in this embodiment, is an electrically powered motor and fan unit (not shown), that is located in a motor housing 60 on the left hand side of the body 6. The motor housing 60 includes a curved inlet mouth 62 that opens at the cylindrical shaped wall of docking portion 50 thereby to match the cylindrical curvature of the separating apparatus 10. Although not seen in FIG. 4, the separating apparatus 10 includes a clean air outlet which registers with the inlet mouth 62 when the separating apparatus 10 is engaged in the docking portion 50. In use, the suction motor is operable to create low pressure in the region of the motor inlet mouth 62, thereby drawing dirty air along an airflow path from the suction opening 26 of the cleaner head 24, through the conduit 34 and duct 42 and through the separating apparatus 10 from dirty air inlet 52 to the clean air outlet. Clean air then passes through the motor housing 60 and is exhausted from the rear of the robot 2 through a filtered clean air outlet 61. Although not shown in the drawings, a pre-motor filter may be housed in the motor inlet mouth 62 to provide a degree of pre-filtering of the air processed by the separating apparatus before the airflow enters the suction generator.

Figure 4:
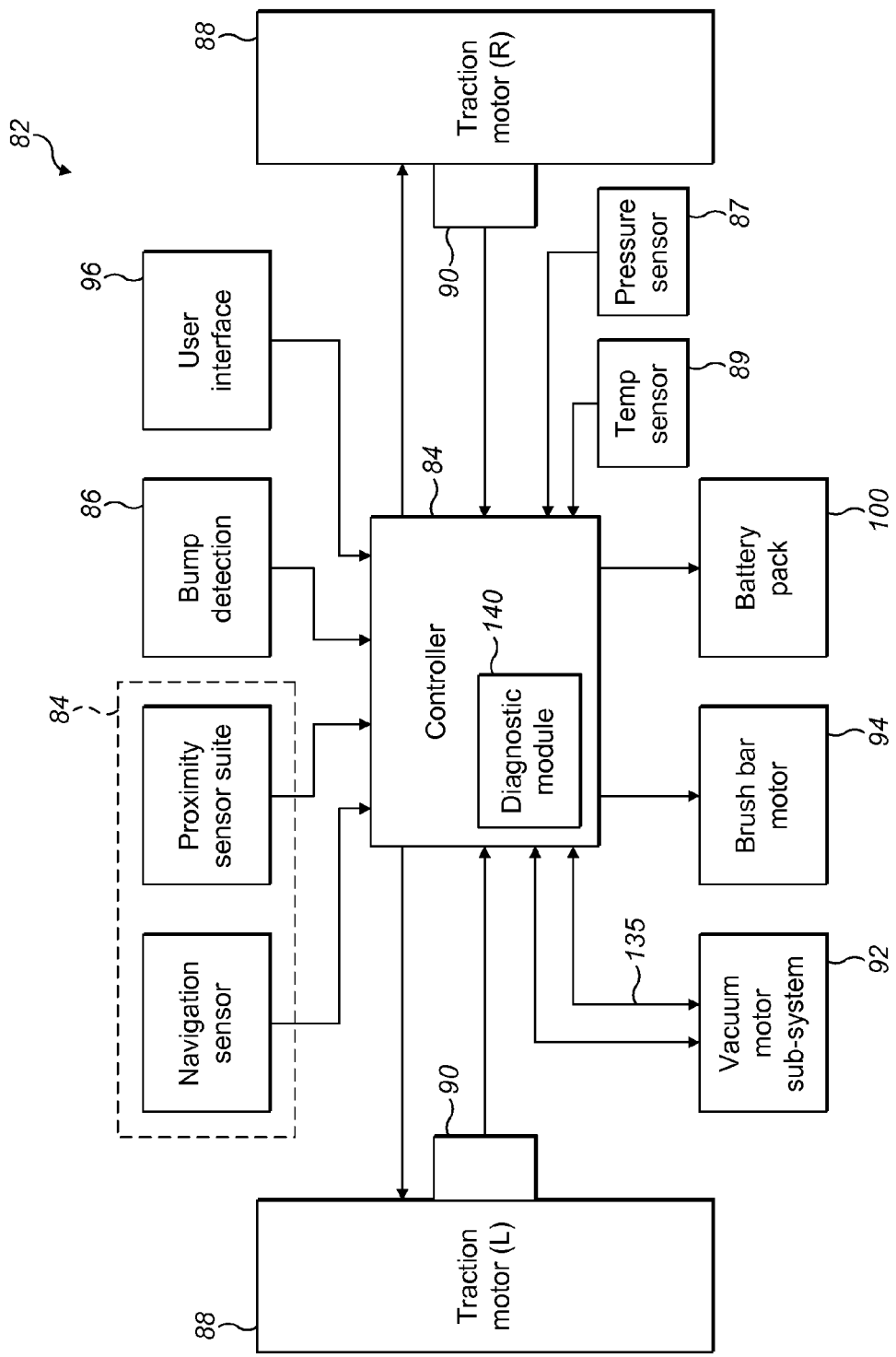
FIG. 4 is a block diagram of a control system of the vacuum cleaner in FIG. 1.
Figure 5:
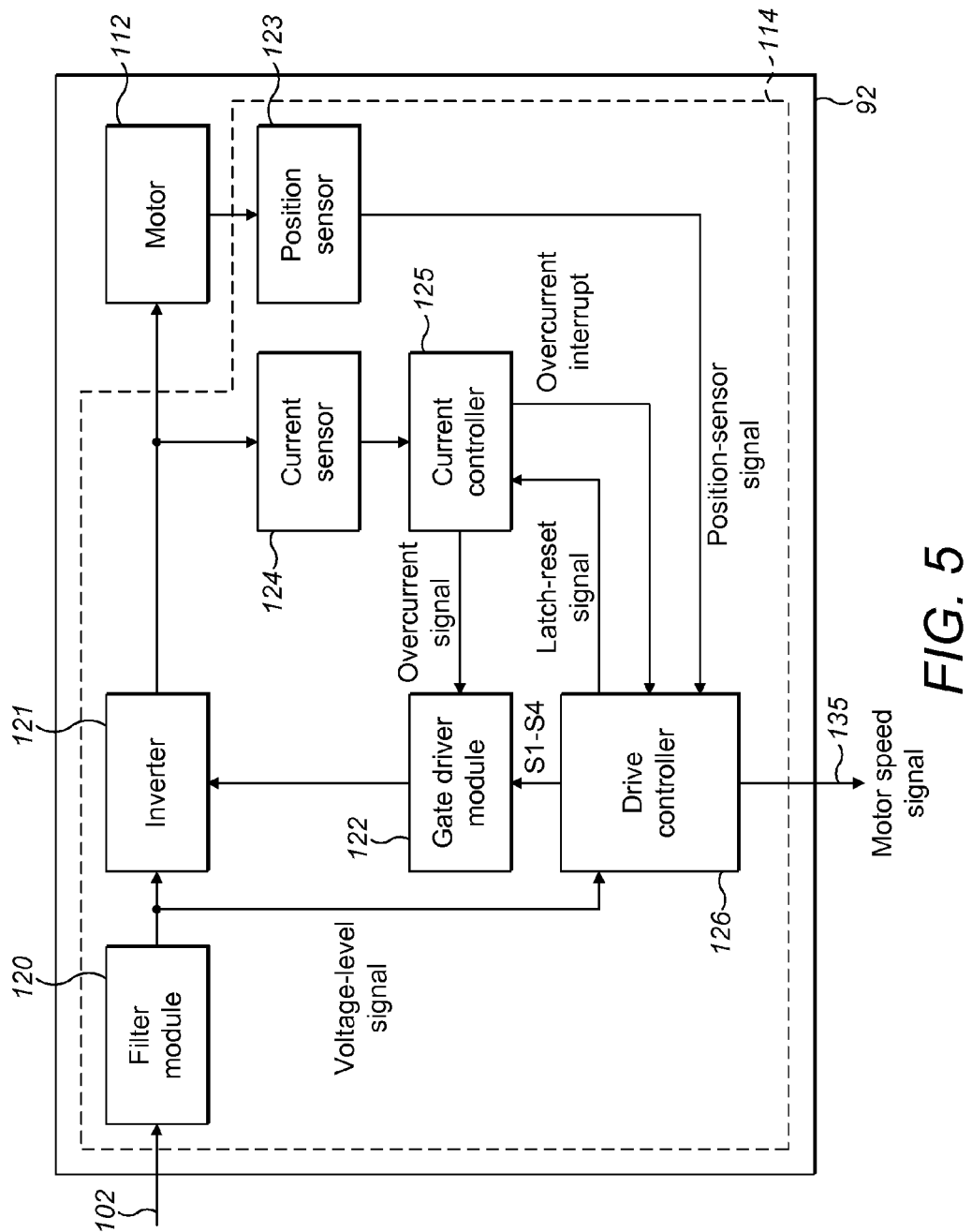
FIG. 5 is a block diagram of a vacuum motor sub-system shown in FIG. 4.

The cover 8 is shown separated from the body 6 in FIG. 4 and, since the chassis 4 and body 6 carry the majority of the functional components of the robot 2, the cover 8 provides an outer skin that serves largely as a protective shell and to carry a user control interface 70.

The cover 8 comprises a generally cylindrical side wall 71 and a flat upper surface 72 which provides a substantially circular profile corresponding to the plan profile of the body 6, save for the part-circular cut-out 12 shaped to complement the shape of the docking portion 50, and the cylindrical separating apparatus 10.

As shown particularly clearly in FIGS. 1 and 3, the part-circular cut-out 12 of the cover 8 and the semi-cylindrical recess 50 in the body 6 provides the docking portion a horseshoe shaped bay defining two projecting lobes or arms 73 which flank either side of the separating apparatus 10 and leave between approximately 5% and 40%, and preferably 20%, of the apparatus 10 protruding from the front of the docking portion 50. Therefore, a portion of the separating apparatus 10 remains exposed even when the cover 8 is in place on the main body of the robot 2, which enables a user easy access to the separating apparatus 10 for emptying purposes.

On the upper edge of the side wall 71, the cover 8 includes a semi-circular carrying handle 76 which is pivotable about two diametrically opposite bosses 78 between a first, stowed or retracted position, in which the handle 76 fits into a complementary shaped recess 80 on upper peripheral edge of the cover 8, and a deployed or extended position in which it extends upwardly.

In operation, the robot 2 is capable of propelling itself about its environment autonomously. To achieve this, the robot 2 carries an appropriate control system 82 that is shown schematically in FIG. 4.

The control system 82 includes a controller 84 having appropriate control circuitry and processing functionality to process signals received from its various sensors and to drive the robot 4 in a suitable manner.

The controller 90 is interfaced into a sensor suite 84 of the robot 4 by which means the robot 4 gathers information about its environment in order to map its environment and perform a cleaning route. It should be noted that the sensor suite 84 is also illustrated in FIG. 3 as being located on the two front lobes 73 of the main body so as to provide a clear view of the way ahead, and also laterally. A bump detecting system 86 is also provided. It should be noted that navigation sensors, proximity sensors and bump detecting sensors are common components on mobile robots, particularly domestic robots. Therefore, the existence of such sensors on the robot 4 is provided here for completeness but they are not intended to form part of the invention.

The controller 90 is also configured to supply drive signals to traction motors 88 associated with the traction units 20 and also to receive odometry data therefrom. For this purpose suitable rotational sensing means 90 such as rotary encoders are provided on the traction motors 88. The control system is therefore operable to control the traction units 20 in order to navigate the robot 2 around the room which is to be cleaned. It should be noted that the particular method of operating and navigating the robotic vacuum cleaner is not material to the invention and that several such control methods are known in the art. For example, one particular operating method is described in more detail in WO00/38025 in which navigation system a light detection apparatus is used. This permits the cleaner to locate itself in a room by identifying when the light levels detected by the light detector apparatus is the same or substantially the same as the light levels previously detected by the light detector apparatus.

Additionally the controller 84 is interfaced to suction motor sub-system 92 and brush bar motor 94 in order to drive and control these components appropriately.

The controller is also provided with data entry input from air density evaluation means in the form of an ambient air pressure sensor 87 and an ambient air temperature sensor 87, the purpose of which sensors will be described later. The pressure sensor 87 and temperature sensor 87 may be integral with the control electronics on the vacuum cleaner but, preferably, the sensors should be located so as to give an accurate as possible measurement of the ambient air conditions of the vacuum cleaner.

A user interface 70 is provided in order for a user to command the robot 4 to start/stop a cleaning process, for example. The user interface 96 is also shown generally in FIG. 1. The user interface 96 may take various forms, such as one or more mechanical buttons or even a graphical user interface with touch screen technology.

Finally, a suitable power input is provided to the controller 84 from battery pack 100. Such a battery pack is generally known in the art and may be composed of a plurality of cells of a variety of cell chemistries. Cell chemistries in the lithium-ion family are currently preferred due to their high power density, low charge loss and lack of memory effect, although other cell chemistries such as nickel metal hydride and nickel cadmium are also acceptable. Preferably, the battery pack comprises six cells arranged to supply a DC voltage of approximately 24.6V.

Having described the general configuration of the electronic control system of the vacuum cleaner, attention will now turn to the vacuum motor sub-system, which is supplied with power from the main controller 84. With reference to FIGS. 5 to 8, the vacuum motor sub-system 92 comprises an electric motor 112 and a motor control system 114. A suitable motor system is described in GB2469138A and will be now described below.

The motor 112 comprises a two-pole permanent-magnet rotor 116 that rotates relative to a stator 118 about which a single-phase winding 119 is wound. The stator 118 is c-shaped, which enables a high fill-factor to be achieved for the winding 119, thereby reducing copper losses and improving the efficiency of the motor 112.

The control system 114 comprises a filter module 120, an inverter 121, a gate driver module 122, a position sensor 123, a current sensor 124, a current controller 125, and a drive controller 126.

The filter module 120 links the power supply 102 from the battery pack 100 via the controller 84 to the inverter 121, and comprises a pair of capacitors C1,C2 arranged in parallel. The filter module 120 acts to reduce ripple in the voltage linked to the inverter 121.

The inverter 121 comprises a full-bridge of four power switches Q1-Q4 that link the power supply 102 to the winding 119 of the motor 112. Each power switch Q1-Q4 is a MOSFET, which provides fast switching and good efficiency over the voltage range of the power supply 102. Other types of power switch might nevertheless be used, such as IGBTs or BJTs, particularly if the voltage of the power supply 102 exceeds the voltage rating of the MOSFETs. Each of the switches Q1-Q4 includes a flyback diode, which protects the switch against voltage spikes from the back emf of the motor 112 during switching.

Commutation of the winding 119 is achieved by activating a first pair of switches Q1, Q4 and a second pair of switches Q2, Q3 alternately In addition to exciting the winding 119, the inverter 121 may be controlled so as to freewheel the winding 119. Freewheeling occurs when the winding 119 is disconnected from the excitation voltage provided by the power supply 102. This may occur by opening all switches Q1-Q4 of the inverter 121. However, the efficiency of the motor system 110 is improved if either the high-side switches Q1,Q3 or the low-side switches Q2,Q4 are closed during freewheeling since current in the winding 119 is able to re-circulate through the switches rather than the less efficient flyback diodes. For the purposes of the present description, freewheeling is achieved by closing both low-side switches Q2,Q4. However, it should be understood that freewheeling might equally be achieved by closing the high-side switches Q1,Q3 or by opening all switches Q1-Q4.

The gate driver module 122 drives the opening and closing of the switches Q1-Q4 of the inverter 121 in response to control signals S1-S4 received from the drive controller 126. The gate driver module 122 comprises four gate drivers 122a-d, each gate driver driving a respective switch Q1-Q4 in response to a control signal S1-S4 from the drive controller 126. The gate drivers 122a,c responsible for the high-side switches Q1,Q3 are additionally driven in response to an overcurrent signal received from the current controller 125. In response to the overcurrent signal, the gate drivers 122a,c open the high-side switches Q1,Q3. The overcurrent signal takes precedence over the control signals S1,S3 of the drive controller 126 such that the high-side switches Q1,Q3 are opened in response to the overcurrent signal irrespective of the state of the control signals S1,S3. This level of control may be achieved through the provision of a NOR gate at the high-side gate drivers 20,22.

The position sensor 123 is a Hall-effect sensor that outputs a signal indicative of the angular position of the permanent-magnet rotor 116. The signal is a digital square wave, with each edge representing the angular position at which the polarity of the rotor 116 changes. The signal output by the position sensor 123 is delivered to the drive controller 126, which in response generates control signals S1-S4 that control the inverter 121 and thus control the electrical power delivered to the motor 112.

When rotating, the permanent-magnet rotor 116 induces a back emf in the winding 119, the polarity of which changes with the polarity of the rotor 116. Consequently, the position-sensor signal provides not only a measure of the electrical position of the rotor 116, but also a measure of the back emf in the winding 119. Ideally, the position sensor 123 is aligned relative to the rotor 116 such that the edges of the position-sensor signal are synchronous, or have a predetermined phase difference, with the zero-crossings of the back emf.

The current sensor 124 comprises a single sense resistor R1 located on the negative rail of the inverter 121. The voltage across the current sensor 124 therefore provides a measure of the current in the winding 119 when connected to the power supply 102. The voltage across the current sensor 124 is output to the current controller 125.

Figure 7:
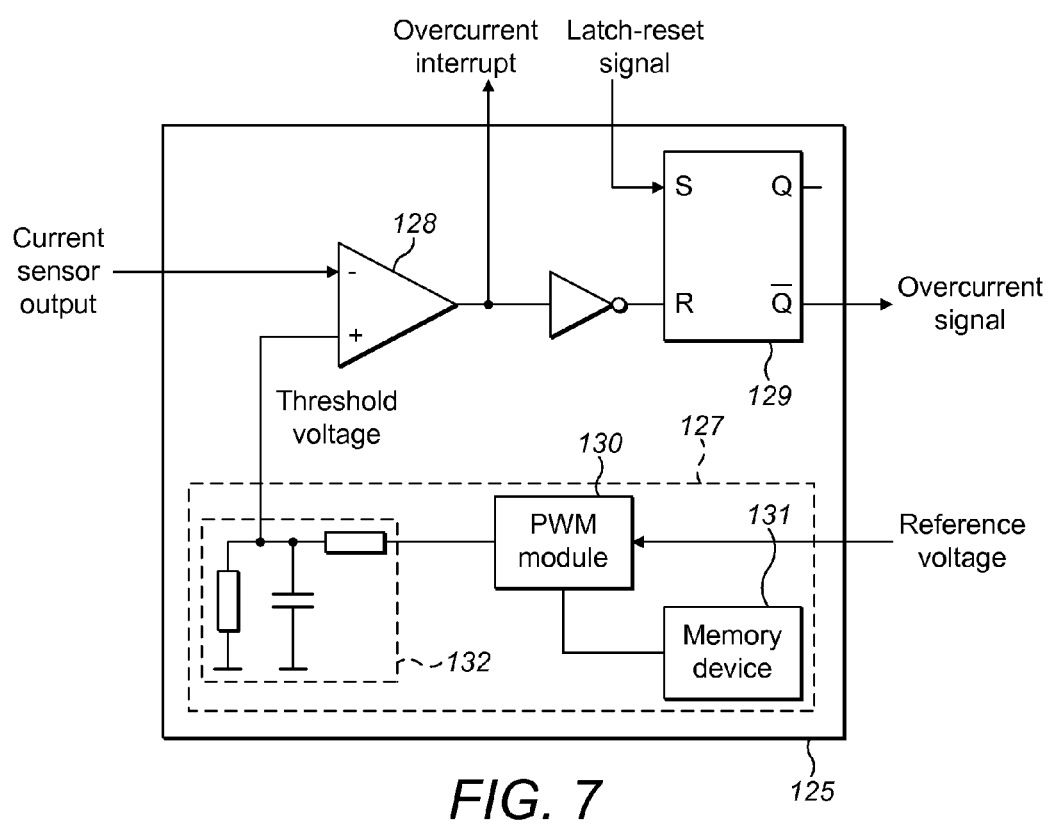
FIG. 7 is a schematic view of a current controller of the vacuum motor sub-system.

Referring now to FIG. 7, the current controller 125 comprises an input, an output, a threshold generator 127, a comparator 128 and an SR latch 129.

The input of the current controller 125 is coupled to the output of the current sensor 124, and the output of the current controller 125 is coupled to the input of each of the high-side gate drivers 122a,c.

The threshold generator 127 comprises a reference voltage input, a PWM module 130, a non-volatile memory device 131, and a filter 132. The PWM module 130 employs a fixed frequency and a variable duty cycle that is set according to a scaling factor stored in the memory device 131. The PWM module 130 operates on the voltage at the reference input to provide a pulsed voltage signal, which is then smoothed by the filter 132 to provide a scaled threshold voltage to the comparator 128.

The comparator 128 compares the voltage at the input of the current controller 15 (present at the inverting input of the comparator 128) against the threshold voltage output by the threshold generator 127. If the voltage at the inverting input exceeds the threshold voltage, the comparator 128 outputs a signal that sets the SR latch 129. In response, the SR latch 129 generates an overcurrent signal at the output of the current controller 125.

When the overcurrent signal is output by the current controller 15 (i.e. when the overcurrent signal is logically high), the high-side gate drivers 122a,c open the high-side switches Q1,Q3. Consequently, the current controller 125 disconnects the winding 119 from the excitation voltage provided by the power supply 102 when the current in the winding 119 exceeds a threshold.

The current controller 125 also outputs an overcurrent interrupt to the drive controller 126. In the embodiment illustrated in FIG. 5, the output of the comparator 128 is delivered to the drive controller 126 as the overcurrent interrupt. However, the overcurrent signal output by the latch 129 might equally be delivered to the drive controller 126 as the overcurrent interrupt. In response to the overcurrent interrupt, the drive controller 16 executes an overcurrent routine. The drive controller 126 generates a control signal S2 or S4 that causes the remaining low-side switch Q2 or Q4 to close such that the winding 119 freewheels. Freewheeling continues for a predetermined time, e.g. 100 µs, during which the current in the winding 119 decays. After the predetermined time has elapsed, the driver controller 16 switches the control signal S2 or S4 so as to open the recently closed low-side switch Q2 or Q4 and outputs an latch-reset signal to the current controller 125. The latch-reset signal causes the latch 129 of the current controller 125 to reset, thereby driving the overcurrent signal low. The inverter 121 is thus returned to the condition that existed before the overcurrent event occurred.

Figure 8:
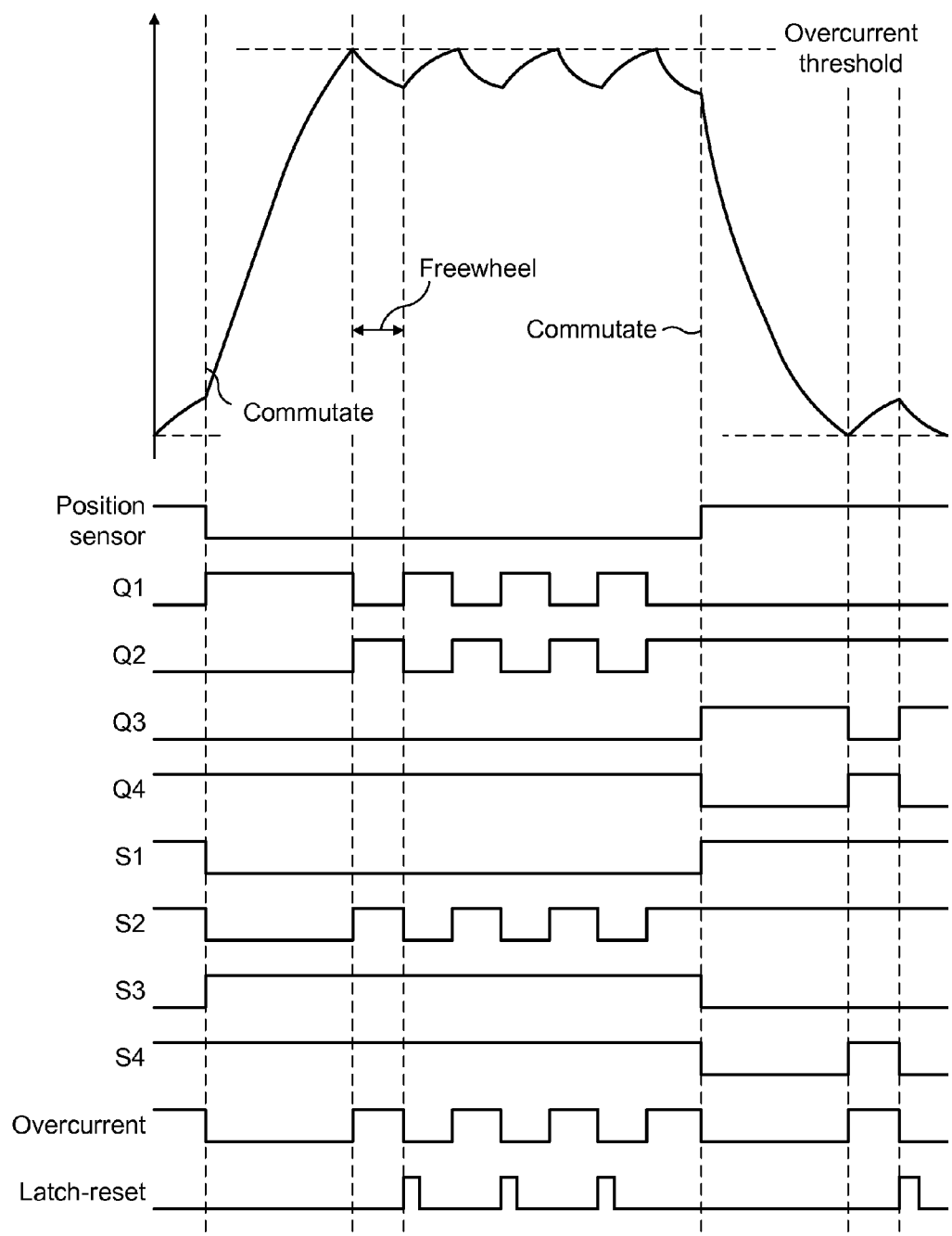
FIG. 8 illustrates waveforms of the vacuum motor sub-system during a period of current control.

FIG. 8 illustrates the waveforms of the winding current, the position-sensor signal, the switches Q1-Q4, the control signals S1-S4, the overcurrent signal, and the latch-reset signal over a typical half cycle. As can be seen, the state of the switches Q1-Q4 is the same before and after each overcurrent event.

The current in the winding 119 may be chopped by the current controller 125 many times during an electrical half cycle, as is illustrated in FIG. 8. As the speed of the motor 112 increases, the back emf induced in the winding 119 increases. Consequently, the number of overcurrent events decreases with motor speed. Eventually, the speed of the motor 112, and thus the magnitude of the back emf, is such that the current in the winding 119 no longer reaches the threshold during each half cycle. The current controller 125 therefore ensures that the current within the winding 19 does not exceed a threshold and, accordingly, excessive currents are prevented from building up in the winding 19, which might otherwise damage the switches Q1-Q4 of the inverter 121 or de-magnetise the rotor 116.

Figure 6:
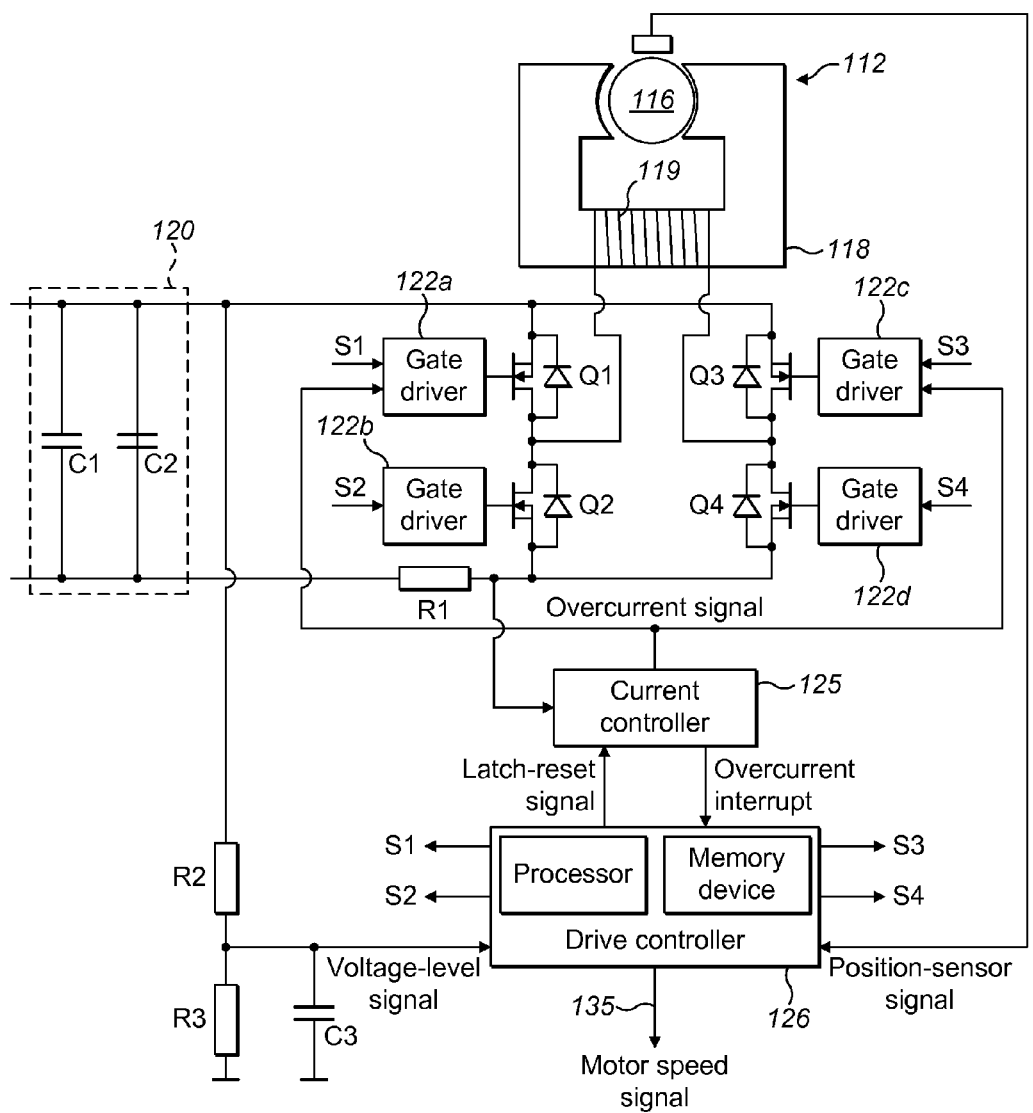
FIG. 6 is a schematic diagram of the vacuum motor sub-system.

Turning now to the drive controller 126, and with specific reference to FIG. 6, the drive controller 126 comprises a processor 133, a non-volatile memory device 134, three signal inputs and six signal outputs.

The memory device 134 stores software instructions for execution by the processor 133, which executes the instructions so as to control the operation of the motor system 92. In particular, the processor 133 generates control signals S1-S4 that control the switches Q1-Q4 of the inverter 121 and thus drive the motor 112. The particular operation of the drive controller 126 is described in further detail below. The memory device 134 is also configured to store a plurality of power maps, a plurality of speed-correction maps, and a plurality of position-sensor offsets. However, such features are not central to the inventive concept and so will not be described here further.

As mentioned, the processor 133 has voltage-level signal that is derived from the power supply line, scaled by a potential divider R2,R3 and filtered by a capacitor C3 to remove switching noise. The six signal outputs are the four control signals S1-S4, the latch-reset signal, and a motor speed signal 135. The four control signals S1-S4 are output to the gate driver module 122, which in response controls the opening and closing of the switches Q1-Q4 of the inverter 121. More specifically, each control signal S1-S4 is output to a respective gate driver 122a-d. The latch-reset signal is output to the current controller 125. Since the drive controller 126 receives a signal indicating the position of the motor, the controller 126 is able to make a determination of the speed of the motor. The drive controller 126 is therefore configured to output the motor speed signal 135 to the main controller 84, the importance of which will become clear later.

The drive controller 126 generates the control signals S1-S4 in response to the signals received at the inputs. In this embodiment of the invention, the timing of the control signals S1-S4 is controlled such that the motor 112 is driven at constant output power over a range of speeds. Moreover, constant output power is maintained irrespective of changes in the voltage of the power supply input 102. Consequently, the motor 112 is driven at constant output power as the battery output voltage reduces during battery discharge so that a substantially constant rate of air mass flow is achieved through the vacuum motor sub-system. In an alternative operational mode of the vacuum motor sub-system, the motor could be controlled so that it runs at a substantially constant speed, which may be desirable in some circumstances. In such an operational mode the drive controller 126 will generate control signals so as to vary the electrical current supplied to the motor as the mechanical load on the motor varies in order to maintain the motor speed at a substantially constant value.

The current controller 125 and the drive controller 126 may form part of a single component microcontroller. A suitable candidate is the PIC16F690 microcontroller by Microchip Technology Inc.

By controlling the energisation times of the winding and the freewheel period in response to changes in both excitation voltage and speed, the motor control system 114 is able to drive the motor 112 at constant output power over a range of excitation voltages and motor speeds. In the present context, constant output power should be understood to mean that the variance in the output power of the motor 8 is no greater than ±5%.

The motor control system 114 drives the motor 112 not only at constant output power but also at relatively high efficiency (i.e. the ratio of output power to input power), and in particular an efficiency of at least 75% is achievable over the range of excitation voltages and motor speeds. The range of excitation voltages over which constant output power and/or high efficiency is achieved is relatively broad and, for a typical 6-cell battery pack the excitation voltage range is 16.8-23.0 V. This represents a relatively large range over which constant output power and/or high efficiency is achieved. Accordingly, the motor control system 114 is ideally suited for use in driving a motor of a battery-powered product, where the excitation voltage varies as the battery discharges.

With the motor control system 114 described here, a single-phase permanent-magnet motor 112 may be driven at relatively high speeds, and in particular at speeds in excess of 60 krpm. Moreover, high speeds are achieved at relatively high efficiency. Indeed, speeds in excess of 100 krpm are attainable for an input power less than 200 W. Accordingly, high speeds are attainable at relatively high efficiency without the need for additional phase windings, which would increase the cost and size of the motor.

In the context of a vacuum cleaner, since the motor sub-system 92 maintains constant output power over an operating speed range, the vacuum cleaner, whether it is a robotic vacuum cleaner, a handheld vacuum cleaner or otherwise, is able to maintain constant air mass flow through the machine over a range of loads and in response to changes in the voltage of the power supply 2. So, the motor system is particularly useful where the power supply is a battery pack, since the vacuum cleaner is able to maintain constant suction as the battery pack discharges. However, although particularly suited to a battery-powered device, the motor system also has utility in the context of an AC supply, having a rectifier and filter to provide a DC voltage.

Having described the operation of the vacuum motor sub-system 92, it will be appreciated that the motor 112 is operable to output a substantially constant power under a variety of voltages. As such, as the load on the motor changes due to changes of the airflow through the vacuum cleaner, the speed of the motor will also vary. In the alternative mode of operation mentioned above in which the motor is controlled so as to run at a substantially constant speed, a change in the load on the motor will cause the power draw of the motor, and more precisely the motor current, to vary accordingly.

By way of further explanation, if the suction outlet 26 becomes blocked, for example by being occluded by a piece of loose floor covering, the airflow drawn in by the motor 112 will be severely disrupted which will decrease the load on the motor 112 since there will be a reduced mass of air flowing through it. Since the motor 112 is controlled such that its output power is substantially constant, a decrease in the load of the motor 112 will cause its speed to increase over a relatively short time period.

In another blockage scenario, the pre-motor filter upstream of the motor 112 will become clogged with particles if it is not cleaned at regular intervals. An overloaded filter will reduce the airflow through the motor 112 and so will again reduce the load on the motor. As a result, the speed of the motor 112 will rise gradually in keeping with the extent of filter loading. In still another blockage scenario, if the separating apparatus becomes blocked, for example if the user neglects to empty the separating apparatus on a regular basis, this will also reduce the airflow through the motor. Once again, therefore, the load on the motor is reduced which has the effect of increasing the motor speed. In any of these scenarios, hereinafter referred to as 'fault conditions', it is desirable for the vacuum cleaner to be able to detect the fault condition and take appropriate action whether it be to alert the user of the condition or simply to shut down the vacuum motor sub-system. To this end, therefore, the invention comprises a facility to diagnose a blockage condition of the airflow through the vacuum cleaner accurately and robustly which will now be explained in more detail.

Returning briefly to FIG. 4, the controller 84 is provided with a diagnostic module 140 which is operable to monitor the speed of the motor or, alternatively, motor current/load, and the ambient conditions of the vacuum cleaner in order to recognize and act upon a fault condition.

The diagnostic module 140 is shown here as being an integral module part of the main controller 84 the functionality of which is provided by the on-board software of the controller 84. However, the skilled reader will appreciate that the diagnostic module 140 may alternatively be embodied in an application specific processing module separate to the main controller 84.

The principle function of the diagnostic module 140 is to recognize when the motor is running at a relatively low load, indicated by an excessive speed, so as to determine a fault condition of the vacuum cleaner, especially when there is an unacceptable blockage or resistance to airflow. To this end the diagnostic module 140 is operable to run a motor speed monitoring routine 141 whilst the vacuum cleaner is in operation. Importantly, the motor speed monitoring routine 141 is responsive to changes in the ambient air density conditions of the vacuum cleaner in order to ensure that it can detect a fault condition accurately and reliably.

The diagnostic module 140 is also operable to run a second routine which for the purposes of this specification will be referred to as the threshold speed calculator routine 142. The function of the threshold speed calculation routine 142 is to calculate and store a suitable threshold speed value, compensating for the ambient air conditions, which the motor speed monitoring routine 141 may use to determine if a fault condition exists. Each of the first and second routines will now be explained in detail with reference to FIG. 9.

Figure 9:
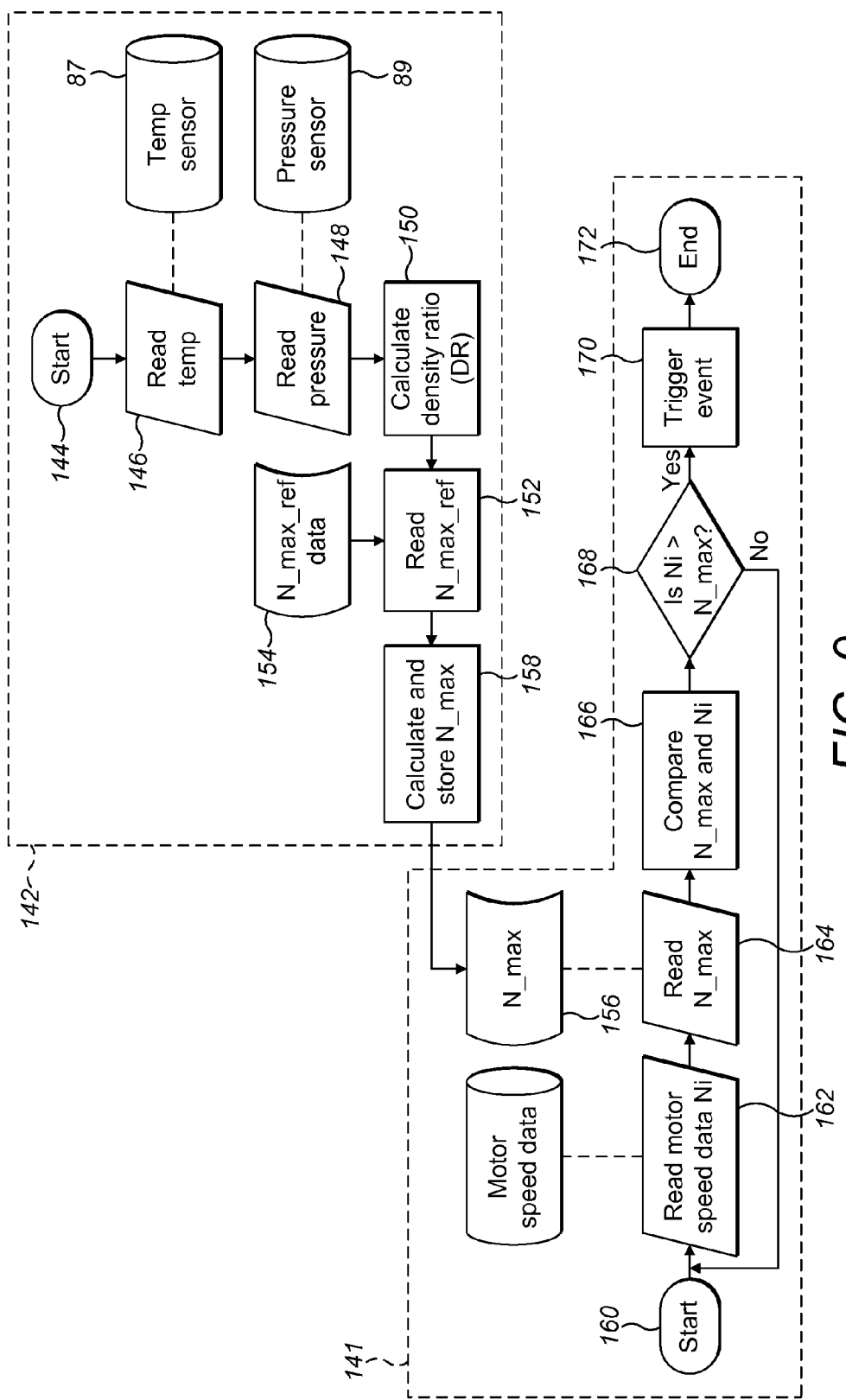
FIG. 9 is a flow diagram illustrating a blockage condition monitoring functionality of the vacuum cleaner.

Referring firstly to the threshold speed calculator routine 142, which is shown in FIG. 9 encircled by the dashed boundary line, the routine 142 preferably is scheduled to run every time the vacuum cleaner is powered on. The routine could also be configured to run periodically, for example every 5 seconds, while the vacuum cleaner is in operation in order to calculate a new threshold speed value at repeated intervals. However, it is envisaged that being run every time the vacuum cleaner is started would be suitable in order to calculate sufficiently accurate compensated threshold speed values to take account of the changing environmental conditions.

Following initiation at start step 144, the routine 142 firstly reads the ambient temperature at step 146 from the temperature sensor 89 and then reads the ambient pressure at step 148 from the pressure sensor 87. At step 150 the routine 142 proceeds to calculate the density ratio (DR).

The density ratio DR is calculated to provide a ratio of the air density in the current ambient conditions of the vacuum cleaner compared to a reference or 'standard' air density. In this example, the reference air density will be considered to be that as determined by the standard pressure and temperature conditions stipulated by the International Electrotechnical Commission (IEC) standard 60312-1—vacuum cleaners for household use:

Temperature: 20° C.
Pressure: 101.3 kPa
R: 287.058 (specific gas constant)

However, it should be appreciated that other reference ambient reference conditions could be used if desired.

The density ratio DR is calculated using equation (1) below which is derived from the ideal gas law P=ρRT, where P is pressure in Pascals, T is temperature in Kelvin, ρ is air density and R is the specific gas constant for dry air (287.058) in units $Jkg^{-1}K^{-1}$.

$$DR = \frac{P_{CURRENT} T_{STANDARD}}{P_{STANDARD} T_{CURRENT}} \quad 1)$$

In equation (1), the suffix 'standard' refers to the reference parameter and the suffix 'current' refers to the parameter as measured instantaneously at steps 146 and 148.

Following the calculation of the density ratio DR, at step 152 the routine reads a reference speed value from data store 154, which may be any suitable non-volatile memory. The reference speed value represents the speed of the motor that is indicative of a predetermined blockage condition of the vacuum cleaner under 'standard' ambient conditions. For instance, the vacuum motor sub-system 92 may run at 70 krpm under normal conditions but, when blocked, the vacuum motor speed may rise to 78 krpm.

The reference speed value may be determined either theoretically or empirically, for example during an on-line test of the vacuum cleaner as will be described later. The reference speed value will hereinafter be referred to as N_max_ref.

Having retrieved a value of N_max_ref at step 152, the routine 142 then calculates and stores in data store 156 a maximum motor speed threshold value at current ambient conditions at step 158. The maximum motor speed value at current ambient conditions will hereinafter be referred to as N_max.

Referring to the calculation step 158 in more detail, the calculation of N_max involves a derivation from the fan affinity laws. The fan affinity laws are a set of rules to describe the interconnected relationships between speed, flow, power, and pressure in fans, turbines, and similar devices and would be understood by the skilled person. The third affinity law relates the impeller power 'W' of a fan, to its rotational speed 'N', the impeller diameter 'D' and air density 'ρ' and may be expressed by the following equation (2):

$$\frac{W_1}{W_2} = \left(\frac{D_1}{D_2}\right)^5 \left(\frac{N_1}{N_2}\right)^3 \left(\frac{\rho_1}{\rho_2}\right) \quad 2)$$

It will be appreciated from the above description of the vacuum motor system that the output power of the motor is controlled so as to be substantially constant and that the diameter of the impeller is also constant. Given these points, equation (2) can be rearranged to provide a value for N_max, in equation (3) below:

$$N\_max = N\_max\_ref(DR)^{-1/3} \quad 3)$$

The threshold speed calculator routine 142 therefore calculates a threshold speed (N_max) that is indicative of a blockage condition and which compensates for the prevailing ambient conditions in which the vacuum cleaner is operating. In effect, therefore, the calculation step converts the maximum reference speed value N_max_ref that is set at 'standard' environmental conditions to an actual maximum speed value given the prevailing ambient environmental conditions. Since the ambient air density changes with geographical location, but also changes day-to-day in any given geographical location, such compensation process is important to diagnose a fault condition of the vacuum cleaner based on the speed of the vacuum motor both accurately and reliably.

Following the calculation of the 'compensated' air density threshold speed value, N_max, this value is then used by the motor speed monitoring routine 141 as will now be described. The motor speed monitoring routine 141 is run repeatedly whilst the vacuum cleaner is in operation in order to identify promptly a blockage condition of the cleaner. It is envisaged that the motor speed monitoring routine 141 will be run at approximately 10 Hz, although this is not essential to the inventive concept. In general a balance needs to be struck between executing the routine at a fast enough rate to pick up on blockage conditions promptly, but not so fast as to impose a large processing overhead on the control electronics.

Following initiation 160 of the motor speed monitoring calculator routine 141 when the vacuum cleaner is turned on, at step 162 the routine 141 receives the current motor speed data (hereinafter Ni) from the motor speed signal 135 output by the vacuum motor sub-system 92. At step 164, the value of N_max as previously calculated by threshold speed calculation routine 142 is read from data store 156.

At step 166 the values of Ni and N_max are compared and at decision step 168 a determination is made as to whether the value of current motor speed Ni is greater than N_max. If Ni is less than N_max, the process loops back through steps 162 to 168 in order to monitor the vacuum motor speed continuously. In circumstances where it is determined that motor speed Ni exceeds N_max the process flow proceeds to step 170 in which an event is triggered in response to the motor overspeed condition prior to terminating at step 172.

In the above example, the maximum allowed motor speed threshold N_max is set so as to indicate a blockage in the suction opening 26 of the robotic vacuum cleaner. For example, the robotic vacuum cleaner may have travelled over a piece of loose flooring or a magazine which 'clamps' over the suction opening 26 causing a dramatic reduction in pressure upstream of the vacuum motor 112. In response to the blockage condition, the event trigger step 170 may be configured so as to simply shut down the vacuum motor.

However, in an alternative embodiment, the event trigger initiates a recovery routine in the controller 84.

In a recovery routine in accordance with an embodiment of the invention, the controller 84 commands the vacuum motor subsystem to power down, but the traction drive units are permitted to continue operating thereby driving the vacuum cleaner in a forward direction. In the blockage condition described above, continue driving movement of the vacuum cleaner following shutdown of the vacuum motor sub-system 92 may assist to clear whatever material has blocked the suction outlet of the vacuum cleaner. After a predetermined period, either a period of time or a predetermined distance, the controller 84 commands the vacuum motor sub-system to restart and, at this point, the motor speed monitoring routine 141 is initiated once again at step 166. If the blockage condition still exists, then the recovery routine may again try to clear the blockage by shutting down the motor subsystem temporarily. After a predetermined number of attempts at clearing the blockage the recovery routine may simply trigger a full shutdown of the machine and provide an appropriate signal to the user via a user interface.

In the recovery routine described above, instead of shutting down the vacuum motor entirely, the controller 84 may instead command the vacuum motor sub-system to run the vacuum motor at a reduced speed.

As an enhancement to the above motor speed monitoring routine 141, a plurality of maximum motor speed thresholds may be monitored and different recovery routines may be triggered depending on which maximum motor speed threshold is exceeded.

In addition, the invention may be employed to detect when a filter or separating system is not installed in the system, for example, in circumstances when a user has not replaced the pre-motor filter in the vacuum cleaner after removing the filter to be washed, or if a user has mounted the separating system incorrectly. In such circumstances a further predetermined motor speed value may be defined which represents a 'minimum' motor speed threshold which will, if exceeded, indicate too high an air mass flow through the system and so action can be taken to signal to the user that a problem exists.

As a further enhancement to the motor speed monitoring routine 141 described previously, it is envisaged that the routine 141 may be configured to monitor the rate of change of motor speed and compare this rate of change value against one or more predetermined metrics in order to make a determination to implement one of a plurality of recovery routines. For example, if the motor speed exceeds the maximum motor speed threshold and its rate of change is 'high', for example as would be experienced in a suction outlet blockage as discussed above, the event trigger 170 may initiate a temporary shutdown of the vacuum motor subsystem only as described above in an attempt to clear the blockage.

Alternatively, if the motor speed exceeds the maximum threshold and its rate of change is 'low', thereby indicating a filter that has reached a max-load condition over a relatively long time scale, then the event trigger may be configured simply to shutdown the vacuum cleaner and to provide a suitable indication to the user to check the status of the dirt collection chamber. In summary, therefore, a plurality of rate of change thresholds could be established to identify a corresponding plurality of different blockage conditions.

Referring once again to FIG. 9, it has been described that a reference motor speed value is stored in data store 154 and is retrieved by the threshold speed calculation routine 142 at step 152. As has been explained, the reference speed value N_Max_ref represents the speed of the motor that is indicative of a blockage condition under controlled or 'standard' ambient conditions. Although this value may be determined theoretically, it is currently envisaged that a more accurate metric will be determined if it is calculated during a test procedure applied to the vacuum cleaner during manufacture. An example of such a test procedure will now been explained with reference to FIG. 10.

Figure 10:
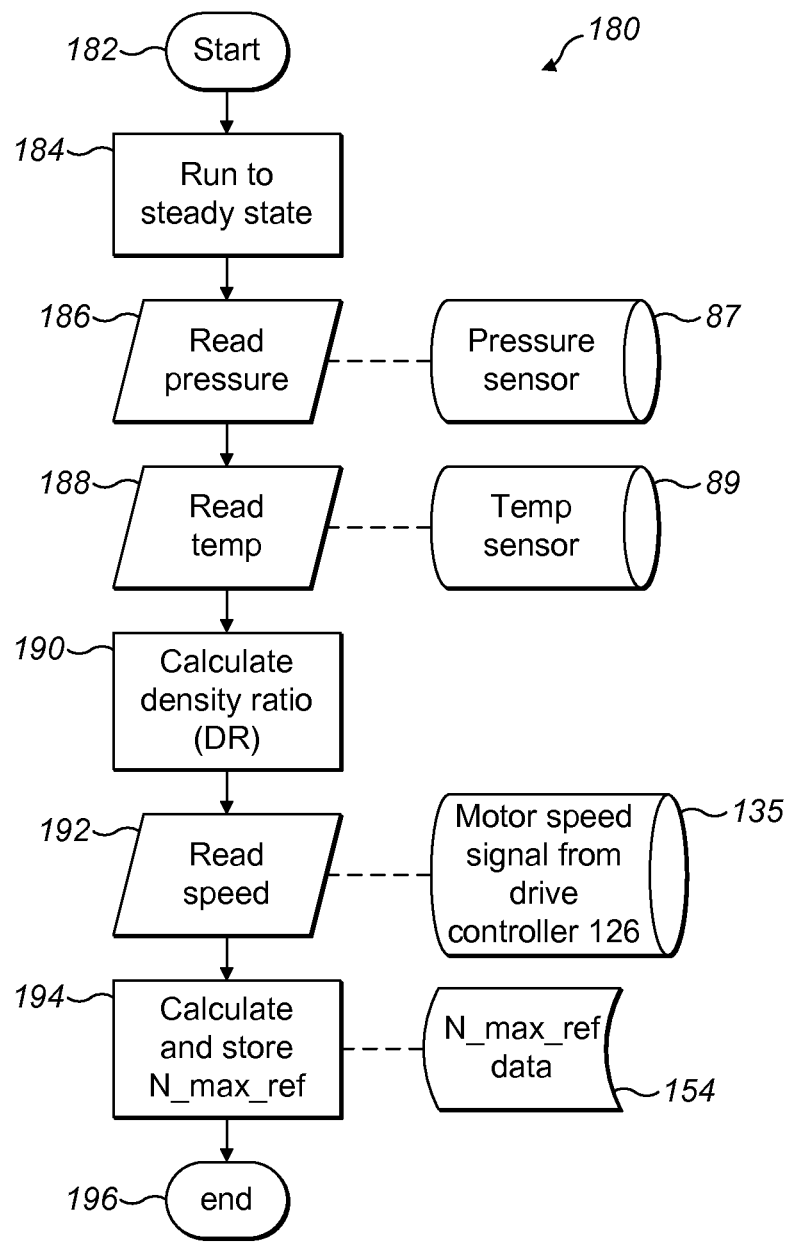
FIG. 10 is a calibration algorithm related to the blockage condition monitoring functionality.

FIG. 10 illustrates a routine 180 configured to be run on the vacuum cleaner or on an item of dedicated electronic test equipment in order to determine a reference speed that is indicative of a blockage condition of the vacuum cleaner when operating under a set of standard ambient conditions. The set of standard operating ambient conditions are the same as those referred to above in the context of the threshold speed calculation routine 142, namely air temperature T, air pressure P and specific gas constant R as specified by the IEC standard 60312-1—vacuum cleaners for household use.

Prior to running the reference speed calculation routine 180, the vacuum cleaner is prepared suitably in order to simulate a blockage condition. For example, this may involve configuring or calibrating the suction opening 26 of the vacuum cleaner with a predefined aperture size that equates to the restriction that would occur with a substantially blocked suction outlet or, alternatively, an overloaded filter or a blocked separating apparatus.

Once the vacuum cleaner is prepared or 'calibrated' in this way, the routine 180 is initiated at step 182 and the vacuum cleaner is run up to steady state at step 184. The vacuum motor will therefore run at a speed which is indicative of a blockage condition, hereinafter referred to as 'N_max_calibrated'. The process then passes to steps 184 and 186 during which the routine 180 takes readings of the prevailing ambient pressure and temperature, respectively, from the pressure sensor 87 and temperature sensor 89.

Once the routine 180 has read the values of ambient pressure and temperature, the process moves to step 190 at which the density ratio DR is calculated using equation (1) as described above.

Following the determination of a density ratio value DR, the routine 180 reads the motor speed N_max_calibrated at step 192 from the motor speed sensor 135 and then, at step 194, calculates a reference motor speed value N_max_ref and stores this value in data store 154 so that it may be used in later calculations, for example by the threshold speed calculation routine 142, as described above.

The manner of calculation of N_max_ref is similar to the calculation of N_max as described above in relation to equation (3). In the reference speed calculation routine 180, the ambient conditions are known, the motor speed indicative of a blockage condition is known (N_max_calibrated) and it is desired to calculate a reference value of motor speed that is indicative of a blockage condition and which applies under the standard ambient conditions. Equation (2) can therefore be used once again, and can be rearranged to provide equation (4), given below:

$$N\_max\_ref = N\_calibrated(DR)^{1/3} \qquad 4)$$

Thus, due to the calibration of the blockage condition on the vacuum cleaner, the motor is running at a 'calibrated' maximum speed indicative of a blockage condition and equation (4) enables the calibrated maximum speed to be referenced to the standard ambient conditions, thereby providing a value of N_max_ref. Beneficially, carrying out this calculation also removes any adverse affects of motor-to-motor speed variations due to tolerance stacks in the motor components.

The above embodiments of the invention have been explained in the context of a robotic vacuum cleaner since such a machine has the potential problem of experiencing a rapid and substantially complete blockage of its suction outlet by loose floor coverings and the like when running autonomously without a user in the vicinity to rescue the situation. However other blockage conditions such as overloaded filters and full dust collectors also affect such a machine and such scenarios apply equally to non-robotic vacuum cleaners, for example upright, cylinder/canister and stick-type vacuum cleaners. In addition, it should be appreciated that the invention is not restricted to the field of vacuum cleaners, but would also be suitable for use in, in principle, any air moving appliance which is vulnerable to being blocked. For example, hair dryers, hand dryers, certain types of cooling fans and heaters, air humidifiers and air sterilizers. Such devices are operable to draw in air through an outlet using a motor and fan unit and to force pressurized air through a nozzle. They have inlets that can become blocked and some include air filters, sometimes HEPA standard air filters that are vulnerable to overloading when their maintenance is neglected. The invention is suitable for diagnosing a blocked filter in such devices.

Having described specific embodiment of the invention above, the skilled person will appreciate that various modifications may be made to the specific embodiments without departing from the inventive concept as defined by the features of the claims and equivalents thereof.

At this point it should be appreciated that in the context of the vacuum motor sub-system that has been described above, the motor speed of the vacuum motor is a motor parameter that is indicative of the load on the motor. This is because when the motor is controlled to a constant output power regime, as described above, the speed of the motor has a direct and quantifiable correlation to the load on the motor. Conversely, if the vacuum motor were to be controlled under a constant speed regime, then the power/current draw of the motor is a parameter that is indicative of the mechanical load on the motor. Therefore in this specification where the motor is being operated under a constant output power regime, references to the parameter 'motor speed' should be considered synonymous with the parameter 'motor electrical input current/power when the motor is being operated under a constant speed regime, or at least a non-constant power regime. In each case, the parameters 'motor speed' and motor electrical input power/current' are both parameters that are indicative of the mechanical rotary load (torque) on the motor or 'motor load parameter values' as referred to in the depending claims.

The processing system and routines of the invention are described with reference to a series of block diagrams or flowchart illustrations and it will be understood that each block of the flowchart illustrations may be implemented by computer program instructions. Such instructions may be carried out by a processor of a general or specific purpose computer, or other programmable data processing device or apparatus, such that the instructions, when executed on such a device or apparatus, implement the functionality expressed in the flowchart blocks.

The instructions may also be stored in a computer-readable memory that can direct a suitable data processing device to function in a particular manner, such that the instructions stored in the memory produce an article of manufacture including instructions that implement the functionality specified in the flowchart blocks.

It should also be noted that each block of the flowchart illustrations represents an item of functionality and that each block may therefore be embodied in a suitable module, or portion of software/firmware code, which comprises one or more executable instructions for implementing the functions. Although the above routines have been described having a certain order, it should also be noted the functions noted in the blocks may occur out of the order specified above depending on the functionality concerned. For example, the steps of reading pressure, temperature and motor speed at steps 186, 188 and 192 in routine 180 in FIG. 10 need not occur in the order specified above but, instead, may in fact be executed substantially concurrently or in a different order.

The invention claimed is:

1. An air moving appliance comprising:
an electric motor coupled to a fan,
a control system for controlling the electric motor
the control system including:
a monitoring element that monitors a motor load parameter;
a memory that stores a predetermined reference motor load parameter value;
a compensating element that determines a compensated reference motor load parameter value based on the predetermined reference motor load parameter value and a set of ambient environment input conditions;
a comparing element that compares the motor load parameter and the compensated reference motor load parameter value and trigger an operational event dependent upon the result of the comparison.

2. The appliance of claim 1, wherein the compensating element includes a pressure sensor to measure the ambient pressure of the environment of the appliance.

3. The appliance of claim 2, wherein the pressure sensor is integrated on an electronics module within the appliance.

4. The appliance of claim 1, wherein the compensating element includes a pressure sensor located in an airflow passage of the appliance.

5. The appliance of claim 4, wherein the pressure sensor is located immediately upstream of the fan.

6. The appliance of claim 1, wherein the compensating element includes a temperature sensor.

7. The appliance of claim 1, wherein the compensating element calculates the compensated reference motor load parameter value to correct for the air density in the environment of the appliance.

8. The appliance of claim 7, wherein the compensating element calculates the compensated reference motor load parameter value when the appliance is turned on.

9. The appliance of claim 7, wherein the compensating element calculates the compensated reference motor load parameter value at repeated intervals.

10. The appliance of claim 1, wherein the predetermined reference motor load parameter value is calibrated to the motor installed within the appliance.

11. The appliance of claim 1, wherein the compensated reference motor load parameter value represents a motor running condition that is indicative of a blockage within the airflow pathways of the appliance.

12. The appliance of claim 11, wherein the comparison element triggers an operational event when the monitored motor load parameter value of the motor exceeds the compensated reference motor load parameter value.

13. The appliance of claim 12, wherein the operational event includes deactivation of the motor.

14. The appliance of claim 1, wherein the appliance is a vacuum cleaner.

15. The appliance of claim 14, wherein the vacuum cleaner is a robotic vacuum cleaner having a drive element, and the operational event includes deactivation of the drive element and de-activation of the suction fan motor.

16. The appliance of claim 14, wherein the vacuum cleaner is a robotic vacuum having a drive element, and the operational event includes deactivation of the suction fan motor for a pre-set period of time whilst the drive element continues to drive the robotic vacuum cleaner.

17. The appliance of claim 1, wherein the memory stores a second reference motor load parameter value.

18. The appliance of claim 17, wherein the second reference motor load parameter value represents a condition that is indicative of the appliance being switched on without an associated filter or separating system installed in the airflow path of the appliance.

19. The appliance of claim 17, wherein the second reference motor load parameter value is compensated for ambient conditions of the appliance vacuum cleaner.

20. A method for controlling an air moving appliance, the method comprising:
at the air moving appliance comprising an electric motor coupled to a fan and a control system for controlling the electric motor:
monitoring a motor load parameter of the motor;
storing a predetermined reference motor load parameter value;
calculating a compensated reference motor load parameter value based on the predetermined reference motor load parameter value and a set of ambient environment input conditions;
comparing the monitored motor load parameter value of the motor and the compensated reference motor load parameter value;

performing an operational event dependent upon the result of the comparison.

21. The method of claim 20, wherein compensated reference motor load parameter value is calculated to correct for the air density in the ambient environment of the appliance.

22. The method of claim 20, wherein the compensated reference motor load parameter value is calculated at a time the appliance is turned on.

23. The method of claim 20, wherein the compensated reference motor load parameter value is calculated at repeated intervals.

24. The method of claim 20, wherein the predetermined reference motor load parameter value is calibrated to the specific motor installed within the appliance.

25. The method of claim 20, wherein the compensated reference motor load parameter value represents a motor running condition that is indicative of a blockage within the airflow pathways of the appliance.

26. The method of claim 25, wherein the comparing element triggers an operational event when the monitored motor load parameter value exceeds the compensated reference motor load parameter value.

27. The method of claim 20, wherein the operational event includes deactivation of the motor.

28. The method of claim 27, wherein the operational event includes reactivation of the motor after a preset time period.

29. A non-transitory computer readable medium storing computer program product, which when executed by an air moving appliance with one or more processors, cause the appliance to perform:
monitoring a motor load parameter of the motor;
storing a predetermined reference motor load parameter value;
calculating a compensated reference motor load parameter value based on the predetermined reference motor load parameter value and a set of ambient environment input conditions;
comparing the monitored motor load parameter value of the motor and the compensated reference motor load parameter value;
performing an operational event dependent upon the result of the comparison.

* * * * *